C. W. CALL, Jr.
MARINE CRAFT.
APPLICATION FILED JAN. 7, 1911.
1,004,362.
Patented Sept. 26, 1911.
3 SHEETS—SHEET 1.
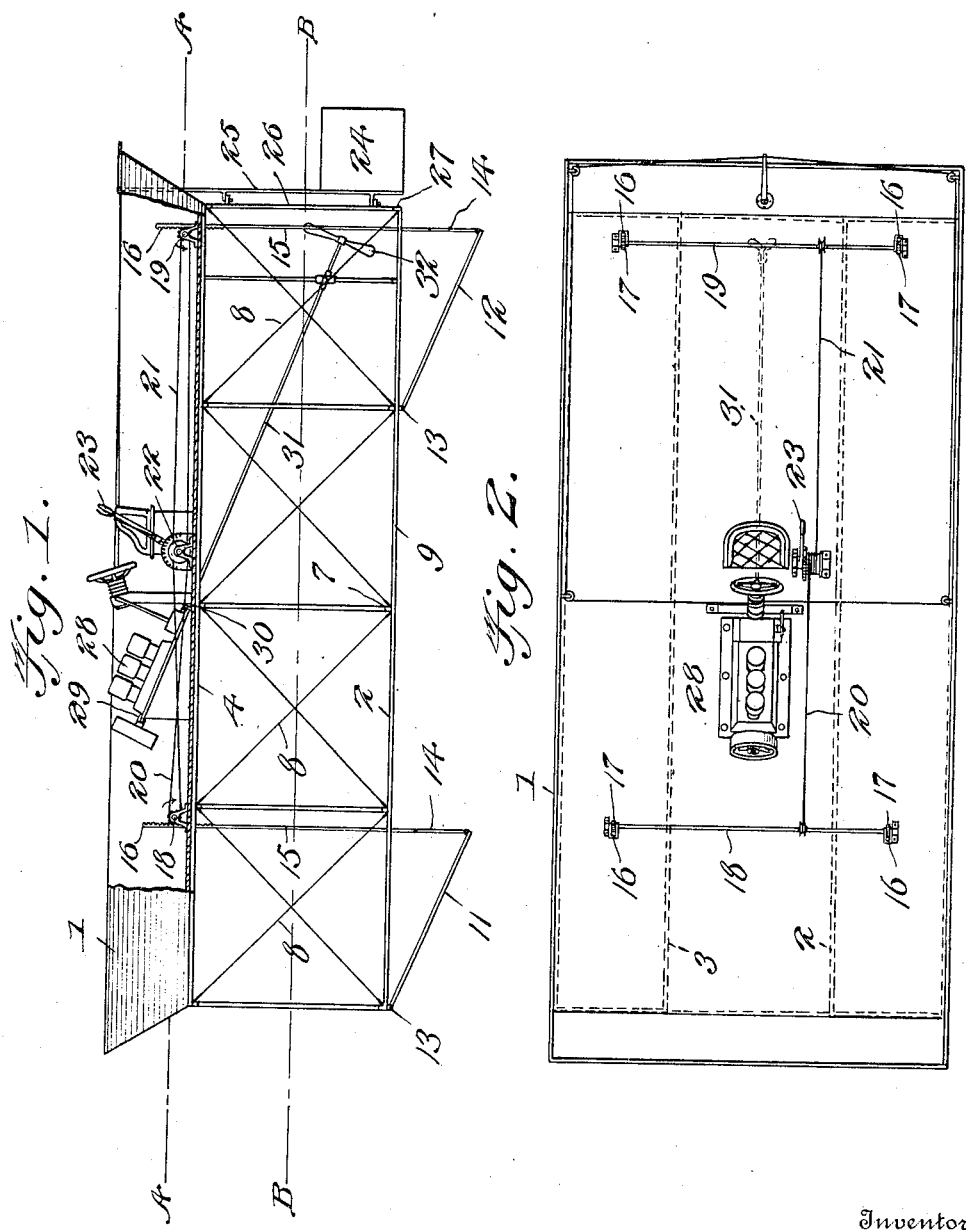
Witnesses
Frank B Hoffman
C. C. Hines
Inventor
Charles W. Call, Jr.
By Victor J. Evans
Attorney

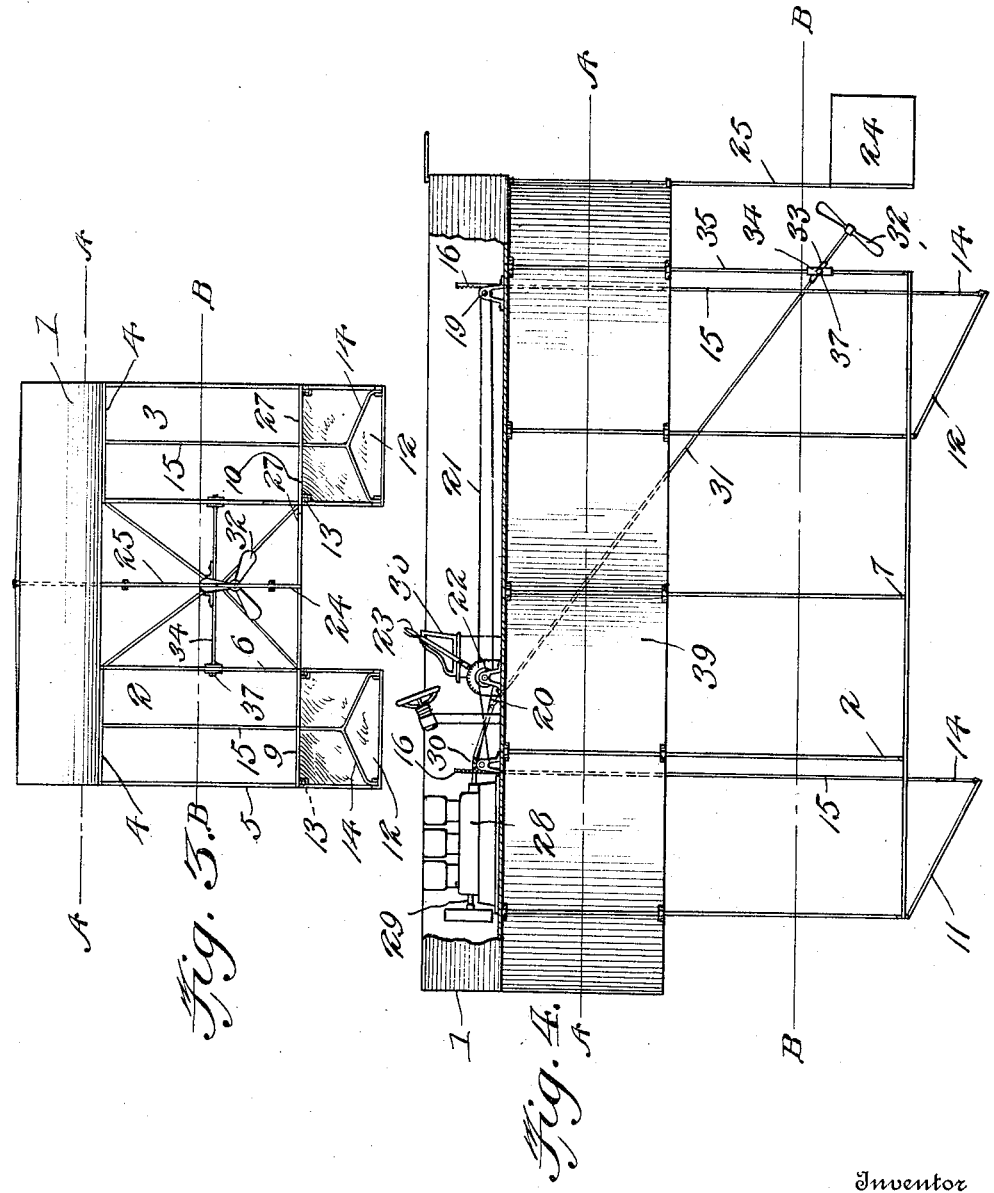

C. W. CALL, Jr.
MARINE CRAFT.
APPLICATION FILED JAN. 7, 1911.

1,004,362.

Patented Sept. 26, 1911.
3 SHEETS—SHEET 3.

Witnesses
Frank B. Hoffman
C. C. Hines

Inventor
Charles W. Call, Jr.
By Victor J. Evans
Attorney

UNITED STATES PATENT OFFICE.

CHARLES W. CALL, JR., OF NORTHPORT, NEW YORK.

MARINE CRAFT.

1,004,362.  Specification of Letters Patent.  Patented Sept. 26, 1911.

Application filed January 7, 1911. Serial No. 601,311.

*To all whom it may concern:*

Be it known that I, CHARLES W. CALL, Jr., a citizen of the United States, residing at Northport, in the county of Suffolk and State of New York, have invented new and useful Improvements in Marine Craft, of which the following is a specification.

This invention relates to marine craft of the high speed type, the main object of the invention being to provide a boat or vessel having sustaining planes adapted to glide through the water at or near the surface thereof when the vessel is in motion, thereby diminishing the resistance to propulsion and enabling higher speeds to be obtained than is possible with vessels having large displacement and whose hulls are forced bodily by power through the water.

A further object of the invention is to provide a vessel of this character in which the hydroplanes or flotation surfaces are so arranged as to secure stability and safety without the necessity of employing a heavy or cumbersome construction, thereby enabling the weight of the vessel to be reduced to the minimum to diminish both the water and air resistance to its motion to a material extent.

A still further object of the invention is to provide a boat of this character having leveling planes for coöperation with the hydroplanes, whereby the depth of submergence of the latter may be controlled as circumstances may require in the operation of the vessel to control the speed and secure safety of the vessel under varying conditions.

A still further object of the invention is to provide a vessel of the character described in which the propeller is adjustable to regulate its depth of submergence to secure maximum efficiency under the different contingencies of service.

The invention consists of the features of construction, combination and arrangement of parts, hereinafter fully described and claimed, reference being had to the accompanying drawings, in which:—

Figure 5:
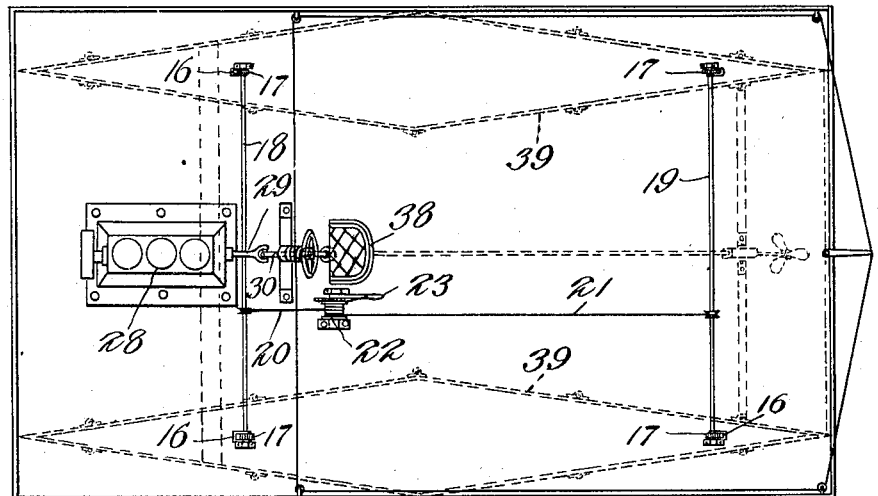
Figure 6:
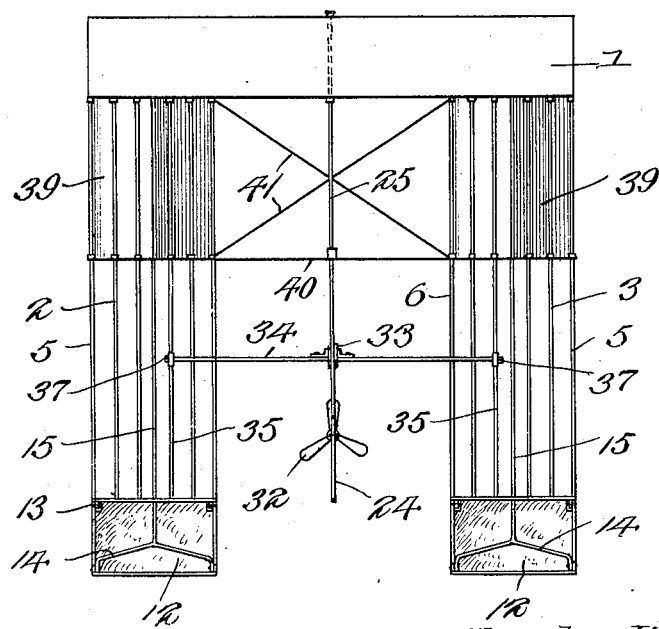

Figure 1 is a view in side elevation of a form of vessel embodying my invention having a hull or body which serves as the flotation medium when the vessel is at rest, a portion of the adjacent side wall of said hull or body being broken away. Fig. 2 is a top plan view of the vessel shown in Fig. 1. Fig. 3 is a rear end elevation of the same. Fig. 4 is a side elevation similar to Fig. 1 of a catamaran type of vessel embodying my invention. Fig. 5 is a top plan view of the vessel shown in Fig. 4. Fig. 6 is a rear end elevation of the same.

Referring to Figs. 1 to 3, inclusive, of the drawings, 1 designates the body or hull of the vessel, which may be in the form of a barge or scow, to the underside of which are bolted or otherwise secured parallel, depending longitudinal frames 2 and 3, disposed on opposite sides of the longitudinal center of said body or hull. Each of these frames comprises a horizontal platform or superstructure 4 from which depend inner and outer series of supporting rods 5 and 6 connected at their lower ends by cross pieces 7, the rods of each series being further connected in pairs by crossed stays 8, of wire or other suitable material, thus securing strength and rigidity of construction.

Secured to the lower ends of the supporting rods of each frame 2 and 3 are hydroplanes 9 and 10 which extend longitudinally in parallel relation and horizontally or in parallel relation with the bottom or deck portion of the body 1. These hydroplanes constitute the flotation surfaces and may be formed of wood, metal or other suitable material, and made of any shape suitable for the purpose. The dotted line A—A indicates the water line when the vessel is at rest, and the dotted line B—B the water line when the vessel is in motion, from which it will be seen that the planes 9 and 10 will be submerged so as to travel through the body of water adjacent the surface. The water will thus flow in effect along the upper and lower surfaces of the planes, which will have a gliding motion therethrough, whereby the sustaining pressure of the water will be secured to insure adequate stability of the vessel, while at the same time the planes will pass through the water without material resistance, enabling high speed to be obtained at the expenditure of comparatively low driving power.

For the purpose of regulating the depth of submergence of the hydroplanes, I provide each hydroplane with a fore and an aft lifting plane 11 and 12, respectively, said lifting planes being pivoted for vertical movement at their forward ends, as at 13, to the underside of the hydroplanes and pivoted at their rear or free ends to yokes 14 on the lower ends of adjusting rods 15. The rods 15 extend upwardly through and are slidably mounted in suitable openings in the hydroplane and deck or bottom wall of the hull and have rack toothed upper ends 16, the rack toothed ends of the respective sets of fore and aft adjusting rods meshing with pinions 17 upon front and rear transverse shafts 18 and 19. To these shafts are connected the free ends of pairs of cables 20 and 21 which are wound at their opposite or inner ends in reverse directions around a drum 22 the shaft of which carries a lever 23 by which the drum may be turned to simultaneously rotate the shafts 18 and 19 inwardly to raise the adjusting rods or to simultaneously rotate said shafts outwardly to depress the rods.

The lifting planes are adapted when depressed to assume an angular position with respect to the hydroplanes, said lifting planes inclining downwardly and rearwardly so as to regulate by their angle of inclination the depth of submergence of the hydroplanes through the tendency of said lifting planes to ride upwardly in the body of water. Through the downward adjustment of the lifting planes from a normal elevated position or an upward adjustment of said planes from their limit of downward movement the vessel as a whole may be raised or lowered when the vessel is in motion, thus enabling the resistance of the planes to propulsion to be varied and the level of travel of the planes to be regulated according to the depth and density of the body of water through which they travel.

If desired, the shafts 18 and 19 may be made in sections or otherwise constructed so as to be operated by the mechanism described to simultaneously raise or lower the lifting planes, while at the same time permitting the sets of port and starboard lifting planes to be independently adjusted by auxiliary operating devices to tilt the vessel in rounding a turn and to facilitate the steering of the same in performing various evolutions in the water. At the rear of the vessel and in the central line thereof is arranged a rudder 24 carried by a steering post 25 hinged or pivoted on a rod 26 secured at its upper end to the platform 4 and at its lower end to a cross piece or brace 27. Any suitable means may be employed for turning this post to adjust the rudder.

The propelling mechanism employed comprises a motor 28 mounted upon the forward portion of the deck and which is arranged in a suitably inclined position. To the shaft 29 of this motor is connected, by a universal joint 30, the upper end of a downwardly and rearwardly inclined propeller shaft 31 carrying at its lower end a screw propeller 32 arranged on a line between and slightly above the rear ends of the two hydroplanes. This shaft is journaled adjacent its lower end in a bearing 33 carried by a cross rod 34 provided on its outer extremities with sleeves slidably engaging guide rods 35 fixed at their upper ends to the deck and at their lower ends to the two hydroplanes. This construction allows the lower end of the shaft to be raised or lowered to vary the working level of the propeller as circumstances may require, the sleeves of the rod 34 being provided with set screws or clamping members 37 to secure the rod in adjusted position. A seat 38 may be provided upon the deck at a suitable point in proximity to the motor and steering gear, so that the pilot or driver may conveniently control and operate the same.

In the form of my invention disclosed in Figs. 4 to 6, inclusive, the same general construction and arrangement of frame sections, hydroplanes, lifting planes, adjusting devices for the lifting planes and propelling mechanism is employed, the vessel therein shown, however, being provided with a pair of spaced parallel pontoons or floats 39 arranged between the hull or body and the plane-carrying frames, said pontoons or floats being bolted or otherwise secured to the body and carrying frames and connected and reinforced by transverse brace bars 40 and crossed stays 41. With this construction it will be understood that the pontoons or floats increase the flotation surface and buoy the vessel to a great degree when at rest or traveling slowly through the water, a catamaran type of body or hull thus being provided. As either form of body disclosed may be employed, or any other suitable form, I do not limit myself in this particular.

It will be apparent from the foregoing description that in starting the vessel in motion the lifting planes may be gradually depressed as the speed of the vessel increases to lift the vessel until the hydroplanes serve as the sole sustaining medium and are raised to the desired distance below the surface of the water, whereby the water resistance will be gradually decreased, allowing the vessel to be propelled at great speed at the expenditure of a comparatively lower amount of driving force. Owing to the arrangement of the hydroplanes disclosed on opposite sides of the longitudinal center line of the vessel, the vessel is given great stability and may be turned at high speed with safety. In practice, the amount of freeboard may be reduced to as large a degree as possible consistent with safety, so as to decrease the air resistance and further increase the speed capacity of the vessel.

Having thus described the invention, I claim:—

1. A marine vessel comprising a hull or body, depending parallel frame structures arranged on opposite sides of the longitudinal center of the hull or body, parallel hydroplanes carried by said depending frame structures, adjustable lifting planes arranged for coöperation with said hydroplanes, means for adjusting said lifting planes, a motor mounted upon the hull or body, a cross piece slidably mounted for vertical adjustment at the stern of the vessel between said frame structures, a propeller shaft, pivotally coupled to the motor shaft and extending on a downward and rearward inclination between the frame structures and journaled at its lower end upon said cross piece, a propeller upon the lower end of said shaft, and means for securing said cross piece in adjusted position.

2. A marine vessel comprising a hull or body, depending parallel frame structures arranged on opposite sides of the longitudinal center of the hull or body, parallel hydroplanes carried by said depending frame structures, adjustable lifting planes arranged for coöperation with said hydroplanes, rods connected with and extending upwardly from the lifting planes and having rack toothed portions, shafts carrying pinions meshing with said rack toothed portions of the rods, and means for simultaneously turning said shafts to raise and lower the rods and lifting planes through the described gearing.

3. A marine vessel comprising a hull or body, depending parallel frame structures arranged on opposite sides of the longitudinal center of the hull or body, parallel hydroplanes carried by said depending frame structures, pivoted lifting planes arranged for coöperation with said hydroplanes, rods pivotally connected with the lifting planes and provided with rack toothed upper ends, a transverse shaft provided with pinions meshing with the rack toothed ends of the rods, drums upon said shafts, an operating drum, flexible connections passing around the drums whereby the rods and lifting planes may be raised and lowered in unison, and means for actuating said operating drum.

In testimony whereof I affix my signature in presence of two witnesses.

CHARLES W. CALL, Jr.

Witnesses:
C. S. Folsom,
John G. Folsom.

Copies of this patent may be obtained for five cents each, by addressing the "Commissioner of Patents, Washington, D. C."